(12) United States Patent
Morimoto et al.

(10) Patent No.: US 9,096,223 B2
(45) Date of Patent: Aug. 4, 2015

(54) HYBRID VEHICLE CONTROL APPARATUS

(71) Applicant: DENSO CORPORATION, Kariya, Aichi-pref. (JP)

(72) Inventors: Youhei Morimoto, Nagoya (JP); Yutaro Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/206,118

(22) Filed: Mar. 12, 2014

(65) Prior Publication Data

US 2014/0277885 A1 Sep. 18, 2014

(30) Foreign Application Priority Data

Mar. 12, 2013 (JP) ................................ 2013-048867

(51) Int. Cl.
| | |
|---|---|
| B60W 20/00 | (2006.01) |
| B60W 10/08 | (2006.01) |
| B60W 10/26 | (2006.01) |
| B60W 10/06 | (2006.01) |
| B60W 30/188 | (2012.01) |

(52) U.S. Cl.
CPC ............ *B60W 20/108* (2013.01); *B60W 10/06* (2013.01); *B60W 10/26* (2013.01); *B60W 20/104* (2013.01); *B60W 30/1882* (2013.01); *B60W 2510/0676* (2013.01); *B60W 2710/0677* (2013.01); *Y02T 10/6226* (2013.01); *Y02T 10/6239* (2013.01); *Y02T 10/6286* (2013.01); *Y02T 10/7005* (2013.01); *Y02T 10/7077* (2013.01); *Y10S 903/93* (2013.01)

(58) Field of Classification Search
CPC ... B60W 20/108; B60W 10/06; B60W 10/08; B60W 10/26
USPC ............................................................ 701/22
See application file for complete search history.

(56) References Cited

U.S. PATENT DOCUMENTS

| | | | |
|---|---|---|---|
| 5,789,882 A | * | 8/1998 | Ibaraki et al. ................. 318/148 |
| 2004/0251065 A1 | * | 12/2004 | Komiyama et al. .......... 180/65.4 |

FOREIGN PATENT DOCUMENTS

JP 3812134 6/2006

OTHER PUBLICATIONS

Machine Translation JP 3812134 published Jun. 2006.*

* cited by examiner

*Primary Examiner* — Mary Cheung
*Assistant Examiner* — Anne Mazzara
(74) *Attorney, Agent, or Firm* — Nixon & Vanderhye PC

(57) ABSTRACT

A control device of a hybrid vehicle minimizes fuel consumption by an internal combustion engine while controlling, for a preset period that substantially corresponds to an update cycle of an instructed fuel consumption change rate, an electrical charge-discharge energy balance of a battery to have a predetermined value, (i) by setting, in a predetermined update cycle, the fuel consumption change rate based on travel pattern information and a target electrical charge-discharge balance and (ii) by setting an engine output power increase/decrease amount based on the instructed fuel consumption change rate and the target drive power.

20 Claims, 7 Drawing Sheets

HYBRID VEHICLE CONTROL APPARATUS

CROSS REFERENCE TO RELATED APPLICATION

The application is based on and claims the benefit of priority of Japanese Patent Application No. 2013-48867 filed on Mar. 12, 2013, the disclosure of which is incorporated herein by reference.

TECHNICAL FIELD

The present disclosure generally relates to a hybrid vehicle control apparatus which uses an engine and a motor generator as power sources.

BACKGROUND INFORMATION

In recent years, hybrid vehicles have drawn public attention due to a demand for low fuel consumption and low emission vehicles. Generally, hybrid vehicles utilize an internal combustion engine and a motor generator as power sources. In some hybrid vehicles, as disclosed in a patent document 1 (i.e., a Japanese Patent No. 3812134), engine power is determined based on a drive power and a battery charge-discharge power so that a battery charge state is maintained within a certain preset range. Drive power is a power applied from a tire to a road surface for a travel of a vehicle. In other hybrid vehicles, a battery charge-discharge amount is determined based on the drive power. As such, by increasing or decreasing the engine power by such a battery charge-discharge amount, the engine is operated at an efficient operating point for improved fuel consumption.

In a hybrid vehicle, in order to effectively improve fuel consumption performance, it is increasingly a requested technique to reduce engine fuel consumption while controlling, to a desired value, an electrical charge-discharge energy balance before and after a travel of a vehicle.

However, in the above-mentioned technique, the electrical charge-discharge energy balance of the battery is not taken into consideration. Therefore, the fuel consumption of the engine may not be reduced while controlling the electrical charge-discharge energy balance of the battery to the desired value. As a result, fuel consumption performance may not improve.

SUMMARY

It is an object of the present disclosure to provide a hybrid vehicle control apparatus that reduces fuel consumption of an engine while controlling an electrical charge-discharge energy balance to a desired value.

In an aspect of the present disclosure, a control apparatus of a hybrid vehicle includes an engine and a motor generator which are installed in the vehicle as a power source of the vehicle. The control apparatus also includes an electric power storage unit that exchanges an electric power with the motor generator and a rate-of-change setting unit that sets, in a predetermined update cycle, a fuel consumption change rate, which represents a rate of change of a fuel consumption by the engine, against a difference between an output power of the engine and a drive power of the vehicle. Further, the control apparatus includes a power adjustment amount setting unit that sets, based on the fuel consumption change rate and a target drive power of the vehicle, an engine output power increase/decrease amount that minimizes the fuel consumption by the engine while controlling, for a preset period, an electrical charge-discharge energy balance of the electric power storage unit to have a predetermined value.

For reasons mentioned later, by keeping the fuel consumption change rate at a constant value for the preset period (i.e., by having a constant change rate for the preset period), the control apparatus of the hybrid vehicle in the present disclosure achieves a minimization of the fuel consumption by the engine (11), while controlling for the preset period, the charge-discharge energy balance of the electric power storage unit (i.e., while controlling an amount of change of the stored energy in the electric power storage unit) to have a predetermined value.

Therefore, by setting, in the predetermined update cycle, the fuel consumption change rate and by setting the engine output power increase/decrease amount based on the fuel consumption change rate and the target drive power, the engine output power increase/decrease amount is set to a value that minimizes the fuel consumption by the engine while controlling, for the preset period (i.e., in a period that substantially corresponds to the update cycle of the fuel consumption change rate), the electrical charge-discharge energy balance of the electric power storage unit to have a predetermined value, together with achieving the target drive power. That is, by controlling the engine according to the engine output power increase/decrease amount, while controlling, for the preset period, the electrical charge-discharge energy balance of the electric power storage unit to have a predetermined value, the fuel consumption by the engine is minimized. Thus, by devising such a control, while controlling a balance of the electrical charge-discharge energy of the electric power storage unit before and after a travel to have a desired value, the fuel consumption by the engine is reduced and the fuel consumption performance is improved effectively.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Some embodiments which respectively realize the present disclosure are described in the following.

(First Embodiment)

The first embodiment of the present disclosure is described based on FIGS. 1 to 7.

Figure 1:
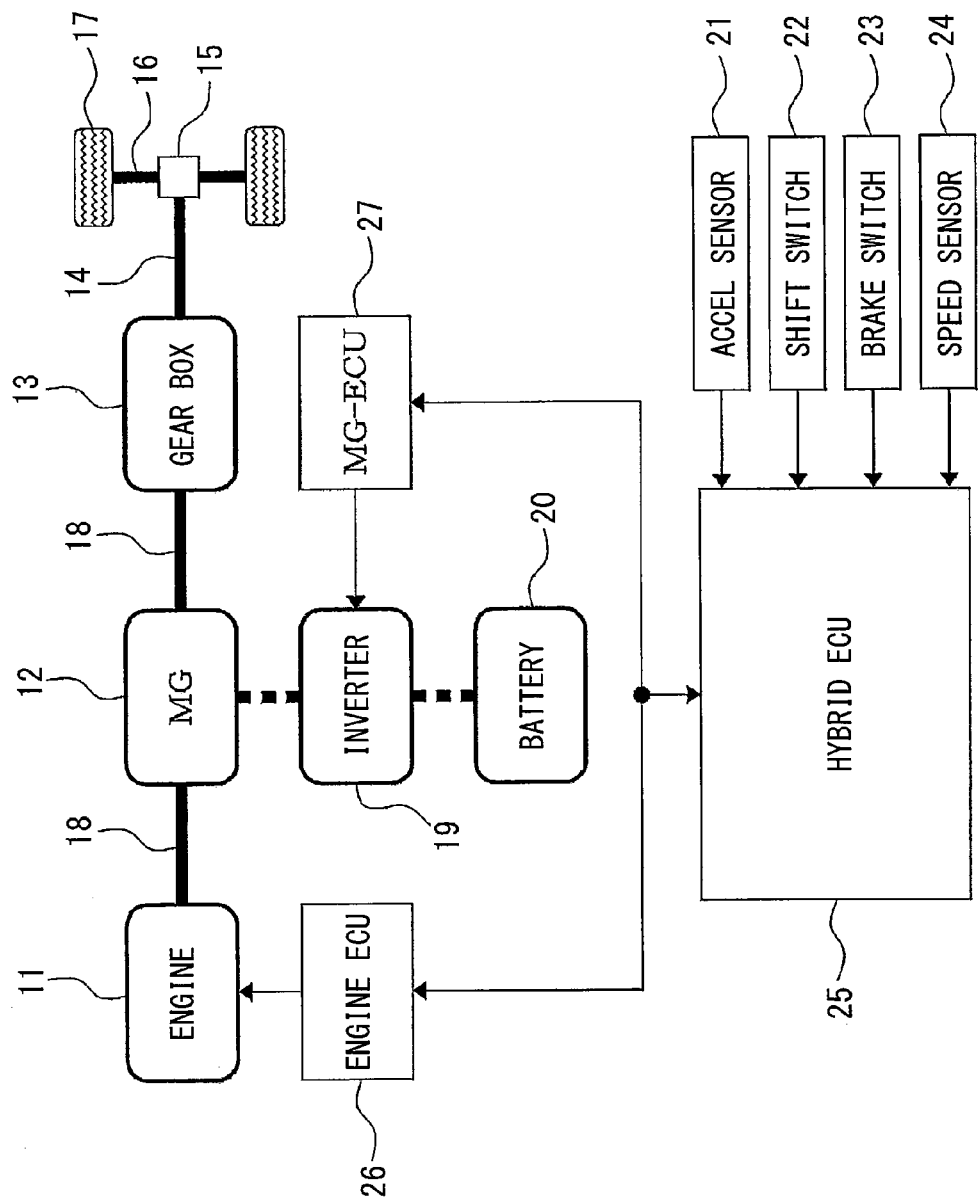
FIG. 1 is a block diagram of a drive system of a hybrid vehicle in a first embodiment of the present disclosure.

First, based on FIG. 1, an outline configuration of a drive system of a hybrid vehicle is described.

The hybrid vehicle has an engine 11 which is an internal-combustion engine and a motor generator (i.e., designated as an "MG" hereafter) 12 installed therein as a power source of the vehicle. The power of the output shaft (i.e., a crankshaft) of the engine 11 is transmitted to a gearbox 13 via the MG 12, and the power of the output shaft of the gearbox 13 is transmitted to a wheel 17 via a drive shaft 14, a differential gear mechanism 15, an axle 16 and other parts. The gearbox 13 may be a step-wise gearbox which chooses one of a plurality of gears in discrete gear ratios, or may be a CVT (i.e., a continuously variable transmission) which continuously changes a gear ratio without having step-wise ratio changes. In the middle of a mechanical connection shaft 18 which transmits the power of the engine 11 to the gearbox 13, a rotation shaft of the MG 12 is connected in a power transmittable manner. Further, an inverter 19 for driving the MG 12 is connected to a battery 20 (i.e., an electric power storage unit in the claims), and the MG 12 exchanges, i.e., provides to and receives from, an electric power with the battery 20 via the inverter 19.

An accelerator opening (i.e., an operation amount of an accelerator) is detected by an accelerator sensor 21, and an operation position of a shift lever is detected by a shift switch 22. Further, a brake operation is detected by a brake switch 23, or an amount of brake operation is detected by a brake sensor, and a vehicle speed is detected by a speed sensor 24.

A hybrid ECU 25 is a computer, which controls an entire vehicle in an integrated manner and detects a drive state of the vehicle by reading various kinds of output signals from sensors and switches. The hybrid ECU 25 transmits and receives a control signal and a data signal with an engine ECU 26 which controls an operation of the engine 11 and with an MG ECU 27 which controls the MG 12 via a control of the inverter 19, and, according to the drive state of the vehicle, the engine 11 and the MG 12 are controlled by each of the ECUs 26 and 27.

In such case, the MG 12 converts the electric power supplied from the battery 20 to the driving power for outputting the driving power to the mechanical connection shaft 18, or converts the driving power inputted from the mechanical connection shaft 18 to the electric power for charging the battery 20. The gearbox 13 outputs the driving power (i.e., a combined power of the engine 11 and the MG 12, or a differential power derived by subtracting, from a power of the engine 11, a power that is converted to the electric power by the MG 12) to the drive shaft 14 after receiving the power from the mechanical connection shaft 18 and increasing or decreasing a speed of rotation of the shaft according to such driving power.

The hybrid ECU 25 charges the electric power to the battery 20, by increasing an engine output power (i.e., an output power of the engine 11) to a magnitude that is greater than a combination of a drive power for driving the vehicle and a loss of power which is consumed at other parts other than the engine 11 (e.g., other parts such as the MG 12, the gearbox 13, the inverter 19, the battery 20, etc.). The hybrid ECU 25 discharges the electric power from the battery 20, by decreasing the engine output power to a magnitude that is smaller than the combination of the drive power for driving the vehicle and the loss of power which is consumed at other parts other than the engine 11 (e.g., other parts such as the MG 12, the gearbox 13, the inverter 19, the battery 20, etc.). In the above situations, the engine output power is, in summary, equal to a sum of (i) the drive power, (ii) the loss of power consumed at the other parts, and (iii) the charge-discharge power of the battery 20 (i.e., the charge-discharge power collectively represents an electric power of one of a charging power for charging the battery 20 and a discharging power discharged from the battery 20).

In a hybrid vehicle, for improving the fuel consumption performance effectively, it is increasingly a requested technique that the fuel consumption of the engine 11 is reduced, while controlling, to a desired value, the electrical charge-discharge energy balance of the battery 20 (i.e., an amount of change of the energy stored in the battery 20) before and after a certain travel of the vehicle.

Figure 6:
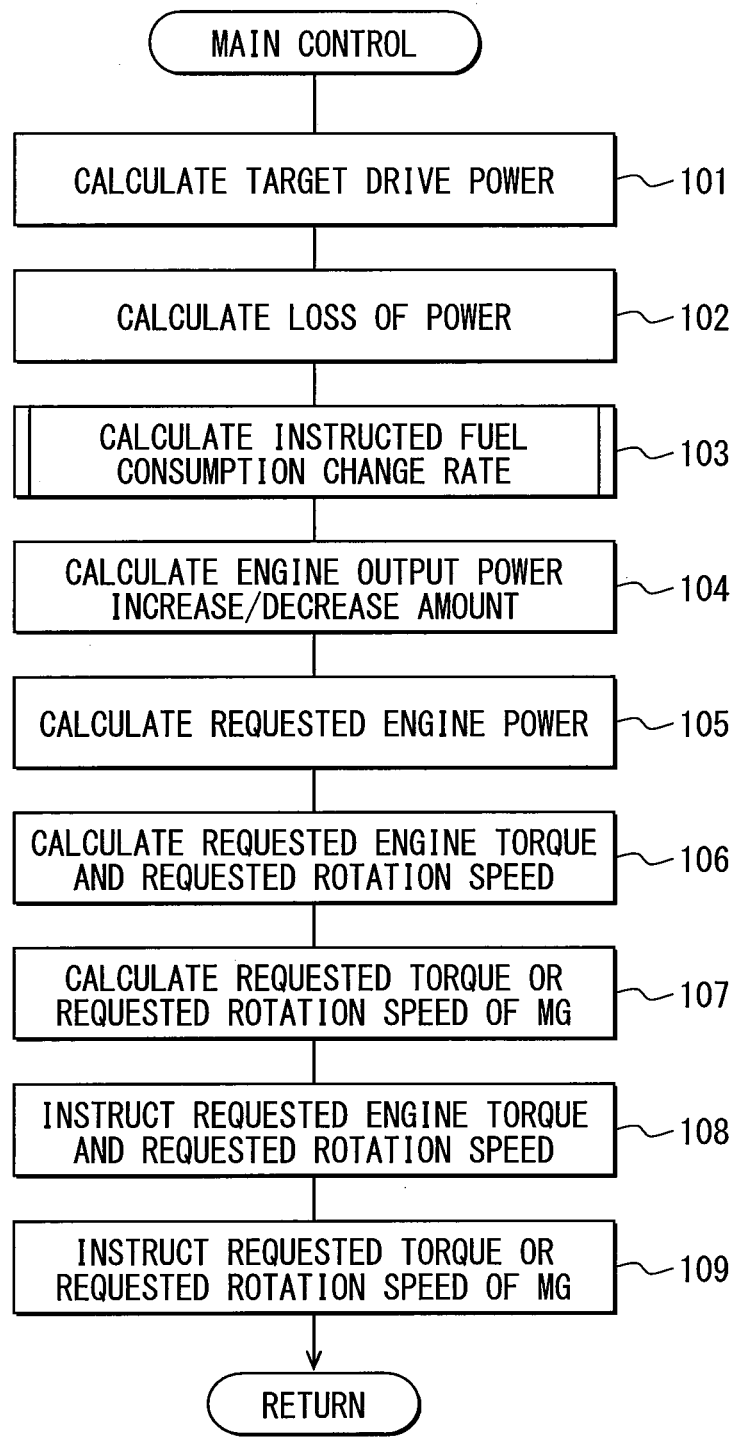
FIG. 6 is a flowchart of processes of a main control routine.
Figure 7:
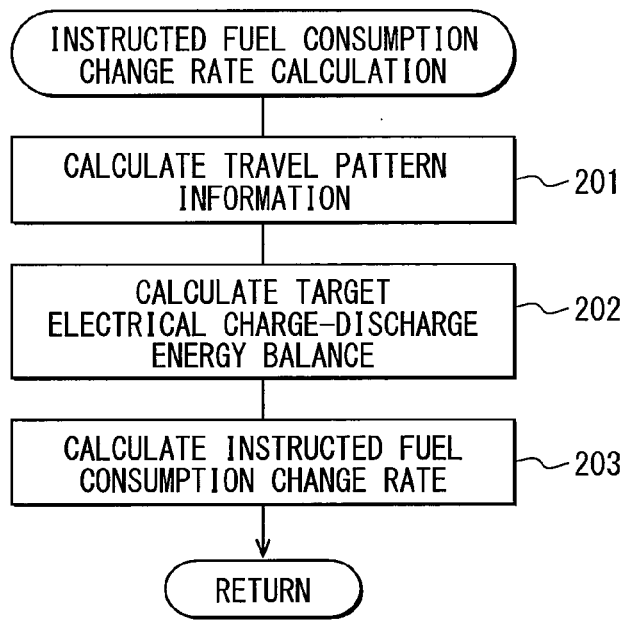
FIG. 7 is a flowchart of processes of an instructed fuel consumption change rate calculation routine in the first embodiment of the present disclosure.

Therefore, in the present embodiment, by executing each of routines in FIG. 6 and FIG. 7 by the hybrid ECU 25, a target drive power of the vehicle is set up in a predetermined update cycle, and the rate of change of the fuel consumption of the engine 11 (i.e., a "fuel consumption change rate" hereafter) against a difference between an engine output power and a drive power for driving the vehicle is set up in another predetermined update cycle (i.e., a longer update cycle longer than the update cycle of the target drive power), and, based on the fuel consumption change rate and the target drive power, an engine output power increase/decrease amount is set to a value that minimizes the fuel consumption by the engine 11, while controlling the electrical charge-discharge energy balance of the battery 20 for a preset period (i.e., in a period that corresponds to the update cycle of the fuel consumption change rate) to have a predetermined value.

Hereafter, reasons for why the engine output power increase/decrease amount is set up to a certain value for enabling a minimization of the fuel consumption by the engine 11, while controlling the electrical charge-discharge energy balance of the battery 20 in a preset period to have a predetermined value is described in the following. First, for the ease of understanding, two drive powers are compared with each other for explanation purposes.

Figure 2:
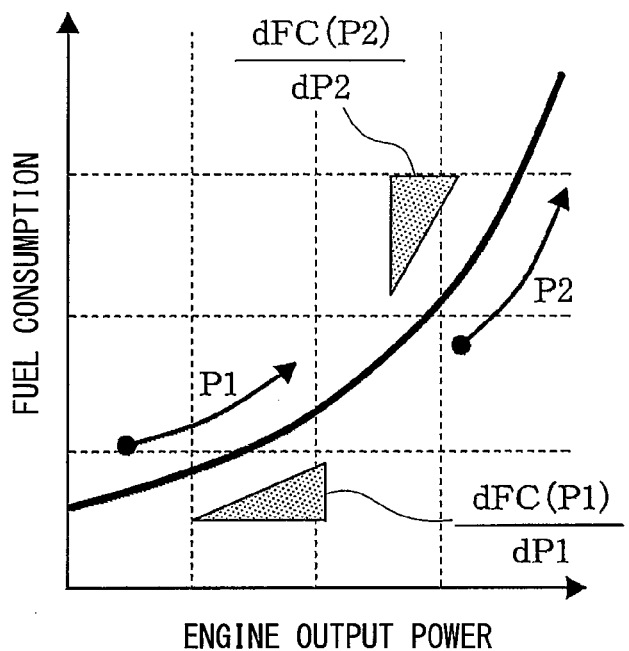
FIG. 2 is a diagram of a characteristic of a fuel consumption by an engine against an engine output power.

The characteristics of the fuel consumption against the engine output power are shown in FIG. 2. The amount of increase/decrease of the engine output power (i.e., an increase in this case) for a certain (i.e., first) drive power and for another drive power (i.e., a second drive power, which is greater than the first drive power) are designated as P1 and P2, respectively. These amounts P1, P2 of increase/decrease of the engine output power are equivalent to a difference of the engine output power and the drive power in the claims. The change of a sum of fuel consumptions FC(P1), FC(P2) (i.e., FC(P1)+FC(P2)) against the amounts P1, P2 representing the engine output power increase/decrease amounts is plotted as a contour line in FIG. 3. Since the electrical charge-discharge energy balance of the battery 20 is represented by P1+P2, a position where the electrical charge-discharge energy balance (i.e., P1+P2) has a constant value (i.e., E) is drawn as a straight line P1+P2=E in FIG. 3, which is a broken straight line.

Figure 3:
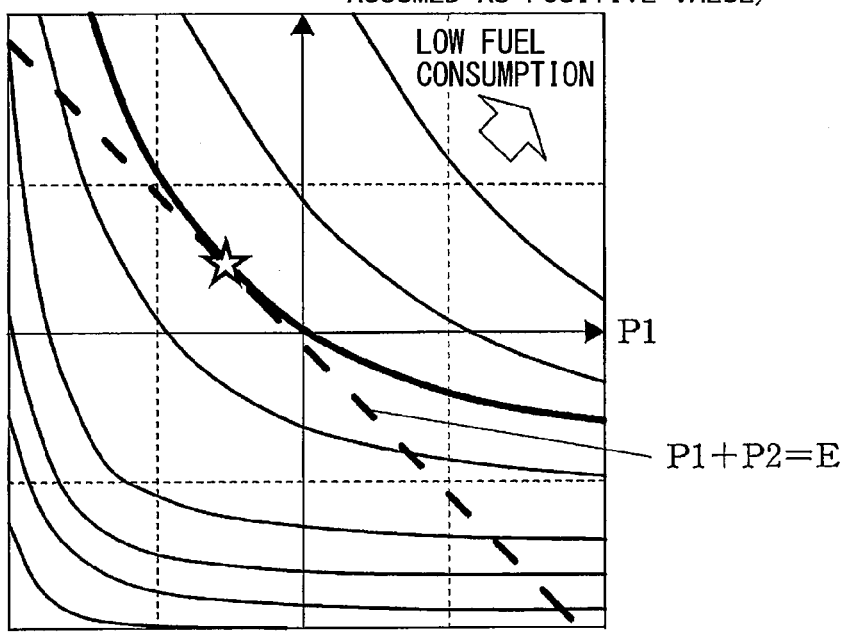
FIG. 3 is a diagram regarding a fuel consumption minimized state.

On such line E, the amounts P1, P2 which minimizes the sum of the fuel consumptions FC(P1)+FC(P2) is represented as a star in FIG. 3, where a fuel consumption contour line touches the broken straight line. A condition represented by the star is interpreted as a matching between the two values, i.e., (i) dFC(P1)/dP1, which is a rate of change of the fuel consumption FC against the amount P1 (i.e., a differential value of the fuel consumption FC for the increase/decrease amount P1) and (ii) dFC (P2)/dP2, which is a rate of change of the fuel consumption FC against the amount P2 (i.e., a differential value of the fuel consumption FC for the increase/decrease amount P2l ). The relationship is expressed by Equation 1 below:

$$dFC(P1)/dP1 = dFC(P2)/dP2 \quad \text{(Equation 1)}$$

Further, since the manipulation of the electrical charge-discharge energy balance before and after a travel is realized as a parallel translation/shift of the broken straight line in FIG. 3, the condition for minimizing the fuel consumption is still interpreted as a matching of the above-described two values. Such a condition is applicable to a situation in which the number of points respectively representing a certain drive power is increased. That is, such a condition is applicable to many/various travel patterns.

For the reasons mentioned above, the fuel consumption by the engine 11 is minimized while controlling the electrical charge-discharge energy balance of the battery 20 in a preset period to have a predetermined value, by keeping the fuel consumption change rate in a preset period at a constant rate (i.e., by keeping the same fuel consumption change rate in the preset period).

Therefore, (i) by setting, in the predetermined update cycle, the fuel consumption change rate and (ii) by setting the engine output power increase/decrease amount based on the fuel consumption change rate and the target drive power, the engine output power increase/decrease amount is set to have a value that minimizes the fuel consumption by the engine 11 while controlling, for the preset period (i.e., in a period that substantially corresponds to the update cycle of the fuel consumption change rate), the electrical charge-discharge energy balance of the battery 20 to have a predetermined value, together with achieving the target drive power. By controlling the engine 11 according to the engine output power increase/decrease amount, while controlling the electrical charge-discharge energy balance of the battery 20 for a preset period to have a preset value, the fuel consumption by the engine 11 is minimized.

Figure 4:
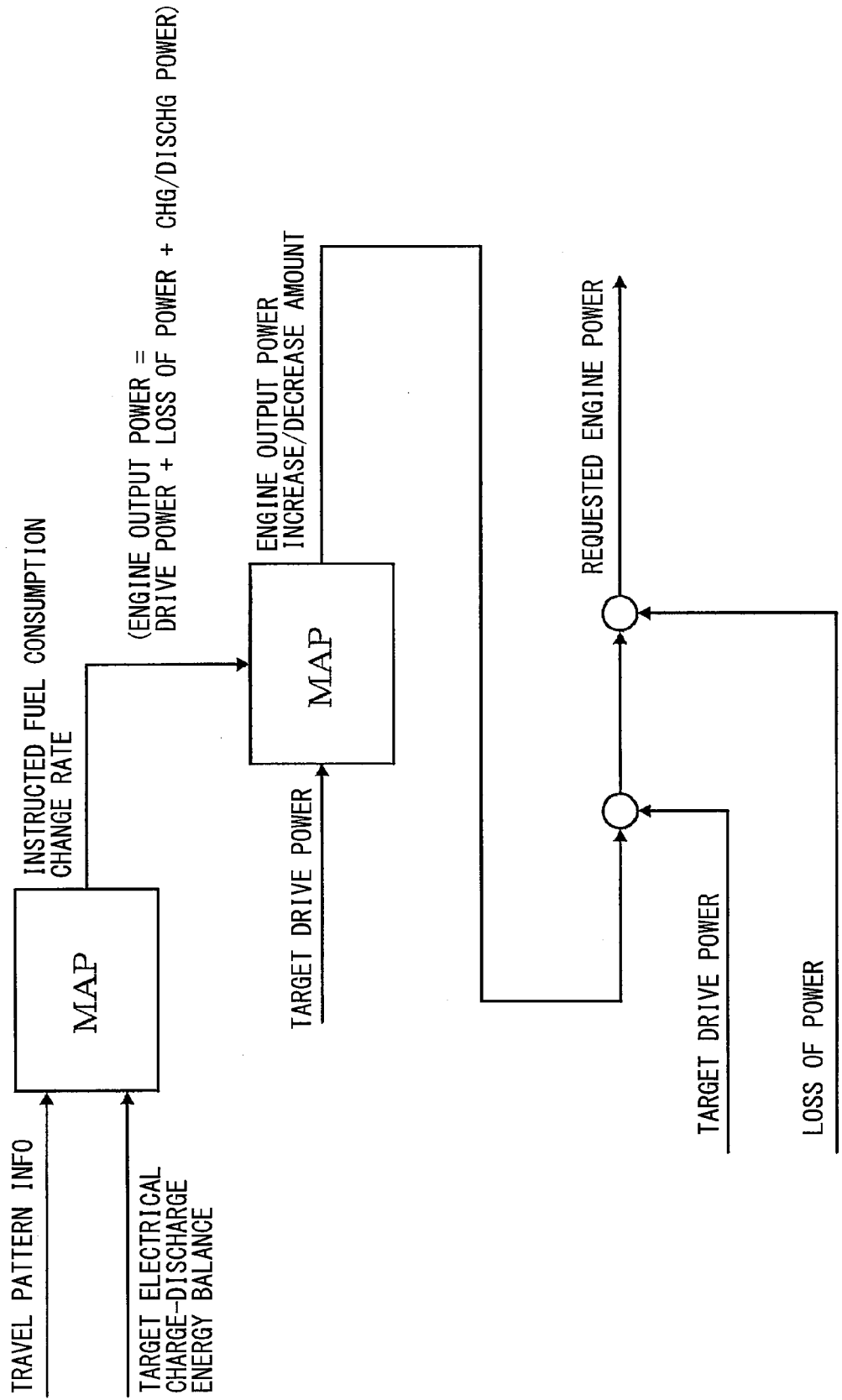
FIG. 4 is a block diagram of calculating a requested engine power.

As shown in FIG. 4, more practically, the target drive power of the vehicle is calculated first, and the loss of power consumed by other parts except the engine 11 (e.g., the MG 12, the gearbox 13, the inverter 19, the battery 20, etc.) is calculated. Further, a target electrical charge-discharge energy balance of the battery 20 as well as travel pattern information of the vehicle are respectively set.

The travel pattern information may be calculated utilizing, for example, information regarding the frequency or percentage of time that the vehicle operates within each of a plurality of drive power classes. Drive power may be classified into drive power classes. For example, the vehicle may classify drive power operation into drive power classes, such as a low drive power class, a medium drive power class, or a high drive power class. Accordingly, the low drive power class may include relatively low drive power output, the medium drive power class may include relatively moderate drive power output, and the high drive power class may include relatively high drive power output. Other examples of drive power classifications may include incremental increases of drive power (e.g., classes that increase/decrease in increments of 20 kW intervals) or a matrix of classes according to drive power versus vehicle speed. The drive powers and vehicle speeds used in the example classifications may be derived from past travel history or future travel states based on navigation information or the like. As such, the travel pattern information may include the frequency or the percentage of time that the vehicle operates within each of the drive power classes.

Alternatively, the travel pattern information may also be calculated an average speed, an average drive power, or the like. Further, the travel pattern information may be predicted and set based on at least one of past travel histories (e.g., a past travel route, a past travel distance, etc.) or travel information from a navigation device (not shown) (e.g., a past travel route, a past travel distance, etc.).

Assuming that a discharged electricity has a positive value, the target electrical charge-discharge energy balance may be set, for example, as a sum of three calculation values, i.e., (i) a discharged energy amount from the battery 20 in an EV travel of the vehicle in which the vehicle travels only by the power from the MG 12, (ii) a charged energy amount that is charged to the battery 20 when the kinetic energy of the vehicle is used in a regeneration and is converted to the electrical energy by the MG 12, and (iii) a requested charge energy amount that is requested to be charged to the battery 20 during the travel of the vehicle. The relationship is expressed by Equation 2 below:

$$\text{Target electrical charge-discharge energy balance} = \text{Discharged energy amount} + \text{Charged energy amount} + \text{Requested charge energy amount} \quad \text{(Equation 2)}$$

Further, based at least on one of the past travel history or the travel information from the navigation device, the charged energy amount, the discharged energy amount, and the requested charge energy amount may be predicted and may be set up as the target electrical charge-discharge energy balance.

Then, based on the travel pattern information and the target electrical charge-discharge energy balance, an instructed fuel consumption change rate is set up in a predetermined update cycle (i.e., an update cycle longer than the update cycle of the target drive power). That is, the instructed fuel consumption change rate is updated at every predetermined time (i.e., at an interval that is equal to an update cycle in the claims). In the present embodiment, a map which specifies a relationship between the travel pattern information, the target electrical charge-discharge energy balance, and the instructed fuel consumption change rate is pre-memorized as "a map of an instructed fuel consumption change rate," and, with reference to such map of the instructed fuel consumption change rate, the instructed fuel consumption change rate is calculated according to the travel pattern information and the target electrical charge-discharge energy balance. The map of the instructed fuel consumption change rate may be created based on test data, design data, etc., and is memorized by a ROM of the hybrid ECU 25.

Then, based on the instructed fuel consumption change rate and the target drive power, the engine output power increase/decrease amount which minimizes the fuel consumption by the engine 11, while controlling the electrical charge-discharge energy balance of the battery 20 for a preset period (i.e., a period that is equivalent to the update cycle of the instructed fuel consumption change rate) to have a predetermined value (i.e., the target electrical charge-discharge energy balance) is set up.

Figure 5:
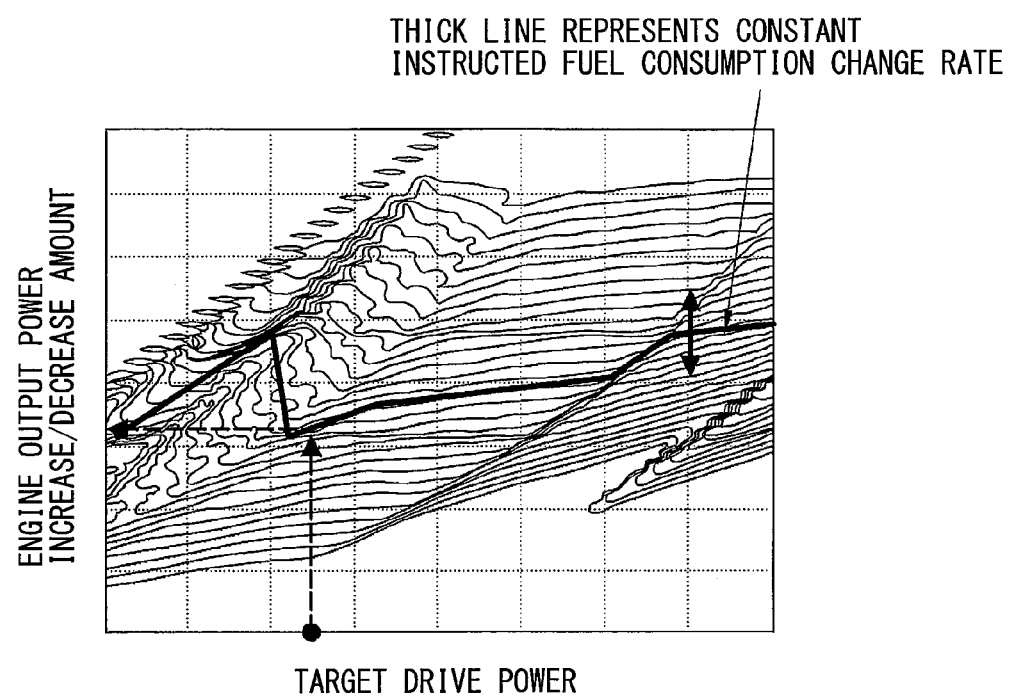
FIG. 5 is an illustration of a map that exemplifies a relationship between an engine output power increase/decrease amount and a target drive power.

In the present embodiment, as shown in FIG. 5, the map which specifies the relationship between the instructed fuel consumption change rate, the target drive power, and the engine output power increase/decrease amount is pre-memorized as "a map of the engine output power increase/decrease amount", and, with reference to the map of the engine output power increase/decrease amount, the engine output power increase/decrease amount according to the instructed fuel consumption change rate and the target drive power is calculated.

A map of the engine output power increase/decrease amount is set up for each temperature information of various parts (e.g., at least one of the engine 11, the MG 12, the gearbox 13, the inverter 19, or the battery 20, etc.), and one of those maps of the engine output power increase/decrease amount is selectively used as a reference for the calculation according to the temperature information from the various parts. These maps of the engine output power increase/decrease amount are created off-line at a time of designing a vehicle, for example, based on energy loss characteristics test data and/or design data of various parts (e.g., at least one of the engine 11, the MG 12, the gearbox 13, the inverter 19, or the battery 20, etc.) and is memorized by the ROM of the hybrid ECU 25.

Then, the target drive power and the loss of power are added to the engine output power increase/decrease amount to calculate the requested engine power, and a torque and a rotational speed of the engine 11 are controlled to realize the requested engine power.

Hereafter, the contents, i.e., processes, of each of two routines in FIGS. 6 and 7 which are performed by the hybrid ECU 25 in the present embodiment are described.

(Main Control Routine)

The main control routine shown in FIG. 6 is repeatedly executed at a calculation cycle T1 during a power-on period of the hybrid ECU 25. When this routine is started, the routine first calculates the target drive power with reference to a map or according to an equation at Step 101 based on an accelerator opening, a vehicle speed, etc. Then, the routine proceeds to Step 102, and the loss of power consumed by the parts except the engine 11 is calculated with reference to a map or according to an equation based on the accelerator opening, the vehicle speed, etc.

Then, the instructed fuel consumption change rate is calculated in Step 103 by executing the instructed fuel consumption change rate calculation routine in FIG. 7 which is described later.

Then, the routine proceeds to Step 104 and the engine output power increase/decrease amount that corresponds to the instructed fuel consumption change rate and the target drive power is calculated, with reference to the map of the engine output power increase/decrease amount in FIG. 5. Under such a circumstance, the map of the engine output power increase/decrease amount is changed according to the temperature information of each of the various parts (e.g., at least one of the MG 12, the gearbox 13, the inverter 19, or the battery 20, etc.), and an appropriate map of the engine output power increase/decrease amount according to the temperature information of each part is chosen for calculation. The process of Step 104 serves as a power adjustment amount setting unit in the claims.

In such case, as an alternative to the temperature information of the temperature of the engine 11, a cooling water temperature may be detected, for example. Further, as an alternative to the temperature information of the temperature of the gearbox 13, temperature of a hydraulic fluid (ATF etc.) may be detected. Further, at least one of the temperature of the engine 11, the temperature of the MG 12, the temperature of the gearbox 13, the temperature of the inverter 19, the temperature of the battery 20, or the other temperature may be estimated (i.e., calculated).

Then, the routine proceeds to Step 105, and the target drive power and the loss of power are added to the engine output power increase/decrease amount, for calculating the requested engine power. Then, after proceeding to Step 106 and calculating a requested torque and a requested rotational speed of the engine 11 based on the requested engine power, the routine proceeds to Step 107, and the requested torque or the requested rotational speed of the MG 12 are calculated.

Then, the routine proceeds to Step 108, and, by instructing the engine ECU 26 on the requested torque and requested rotational speed of the engine 11, the engine 11 is controlled to achieve the requested torque and the requested rotational speed. Then, the routine proceeds to Step 109, and, by instructing the MG ECU 27 on the requested torque or the requested rotational speed of the MG 12, the MG 12 is controlled to achieve the requested torque or the requested rotational speed.

(Instructed Fuel Consumption Change Rate Calculation Routine)

The instructed fuel consumption change rate calculation routine shown in FIG. 7 is a subroutine of the main control routine in FIG. 6 which is performed in Step 103 of the main control routine. The routine is performed at a calculation cycle T2 that is longer than the calculation cycle T1 of the main control routine in FIG. 6.

When the routine is started, the routine first calculates in Step 201 the frequency or the percentage of each of the drive power classes as the travel pattern information, for example. In other words, the travel pattern information may include the frequency or the percentage of time that the vehicle operates within each of the drive power classes. Alternatively, the travel pattern information may also be calculated from the average speed, the average drive power or the like. Further, the travel pattern information may be predicted and set based on at least one of the past travel histories or the travel information from the navigation device. The process of Step 201 serves as an information setting unit in the claims.

Then, the routine proceeds to Step 202, and a sum of the discharged energy amount from the battery 20 in an EV travel of the vehicle in which the vehicle travels only by the power from the MG 12, the charged energy amount that is charged to the battery 20 when the kinetic energy of the vehicle is regenerated and converted to the electrical energy by the MG 12, and the requested charge energy amount that is requested to be charged to the battery 20 during the travel of the vehicle is calculated, and the calculated sum is set up as the target electrical charge-discharge energy balance. Further, based at least on one of the past travel history or the travel information from the navigation device, the charged energy amount or the discharged energy amount or the requested charge energy amount may predicted, and the target electrical charge-discharge energy balance may be set up according to such prediction. The process of Step 202 serves as a balance setting unit in the claims.

Then, the routine proceeds to Step 203, and the instructed fuel consumption change rate corresponding to the travel pattern information and the target electrical charge-discharge energy balance is calculated with reference to the map of the instructed fuel consumption change rate. In such manner, the update cycle of the instructed fuel consumption change rate (i.e., the calculation cycle T2) is made to be longer than the update cycle of the target drive power (i.e., the calculation cycle T1), and the value of the instructed fuel consumption change rate is fixed at a constant value during a period between two update timings (i.e., from one update timing to the next update timing) of the instructed fuel consumption change rate. The process in Step 203 serves as a rate-of-change setting unit in the claims.

The first embodiment of the present disclosure is devised as a control device of a hybrid vehicle in which, (i) by setting, in the predetermined update cycle, the fuel consumption change rate and (ii) by setting the engine output power increase/decrease amount based on the fuel consumption change rate and the target drive power, the engine output power increase/decrease amount is set to have a value that minimizes the fuel consumption by the engine 11 while controlling, for the preset period (i.e., in a period that substantially corresponds to the update cycle of the fuel consumption change rate), the electrical charge-discharge energy balance of the battery 20 to have a predetermined value, together with achieving the target drive power. By controlling the engine 11 according to the engine output power increase/decrease amount, while controlling the electrical charge-discharge energy balance of the battery 20 for a preset period to have a preset value, the fuel consumption by the engine 11 is minimized. By devising such a control, while controlling a balance of the charge-discharge energy of the battery 20 before and after a travel to have a desired value, the fuel consumption by the engine 11 is reduced and the fuel consumption performance is effectively improved.

Further, in the present embodiment, the update cycle of the instructed fuel consumption change rate (i.e., the calculation cycle T2) is made to be longer than the update cycle of the target drive power (i.e., the calculation cycle T1), while a sufficient time period is reserved for stably keeping the instructed fuel consumption change rate at a constant value, the update cycle of the target drive power is sufficiently shortened for a responsiveness of the target drive power in response to the accelerator opening and the like. Further, since the value of the instructed fuel consumption change rate is fixed at a constant value during a period between two update timings of the instructed fuel consumption change rate, the instructed fuel consumption change rate is securely kept at a constant value between the two update timing.

Further, in the present embodiment, the map which specifies the relationship between the instructed fuel consumption change rate, the target drive power, and the engine output power increase/decrease amount is pre-memorized as "a map of the engine output power increase/decrease amount," and, with reference to this map of the engine output power increase/decrease amount, the engine output power increase/decrease amount according to the instructed fuel consumption change rate and the target drive power is calculated. Therefore, without employing a complex calculation process, the engine output power increase/decrease amount is set based on the map of the engine output power increase/decrease amount, thereby reducing a process load of the control unit (e.g., the hybrid ECU 25).

Further, in the present embodiment, for each temperature information of various parts (e.g., at least one of the engine 11, the MG 12, the gearbox 13, the inverter 19, or the battery 20, etc.) a map of the engine output power increase/decrease amount is set up, and one of those maps of the engine output power increase/decrease amount is selectively used (i.e., is changed) as a reference for the calculation according to the temperature information from the various parts. Therefore, according to the change of the relationship between the instructed fuel consumption amount change rate, the target drive power and the engine output power increase/decrease amount due to the change of the loss of those various parts according to the temperature change, the map of the engine output power increase/decrease amount is changed, thereby enabling an accurate setting of the engine output power increase/decrease amount.

Further, in the present embodiment, the instructed fuel consumption change rate is set according to the travel pattern information and the target electrical charge-discharge energy balance. Therefore, by changing the instructed fuel consumption change rate in the preset cycle according to the change of the travel pattern information and/or the change of the target electrical charge-discharge energy balance, the instructed fuel consumption change rate is set to an appropriate value.

Further, in the present embodiment, the map which specifies the relationship between the travel pattern information, the target electrical charge-discharge energy balance, and the instructed fuel consumption change rate is pre-memorized as "the map of the instructed fuel consumption change rate", and, with reference to such map of the instructed fuel consumption change rate, the instructed fuel consumption change rate is calculated according to the travel pattern information and the target electrical charge-discharge energy balance. Therefore, without employing a complex calculation process, the engine output power increase/decrease amount is set based on the map of the instructed fuel consumption change rate, thereby reducing a process load of the control unit (e.g., the hybrid ECU 25).

(Second Embodiment)

The second embodiment of the present disclosure is described with reference to FIG. 8. The description of the second embodiment is focused on a difference of the embodiment relative to the first embodiment, in which description of like parts in the first embodiment will not be repeated or is at least simplified for the brevity of the explanation.

The instructed fuel consumption change rate is updated at every predetermined time in the first embodiment. However, in the present embodiment, by executing an instructed fuel consumption change rate calculation routine of FIG. 8 to be later mentioned by using the hybrid ECU 25, the instructed fuel consumption change rate is updated when the travel pattern information changes more than a certain amount.

Figure 8:
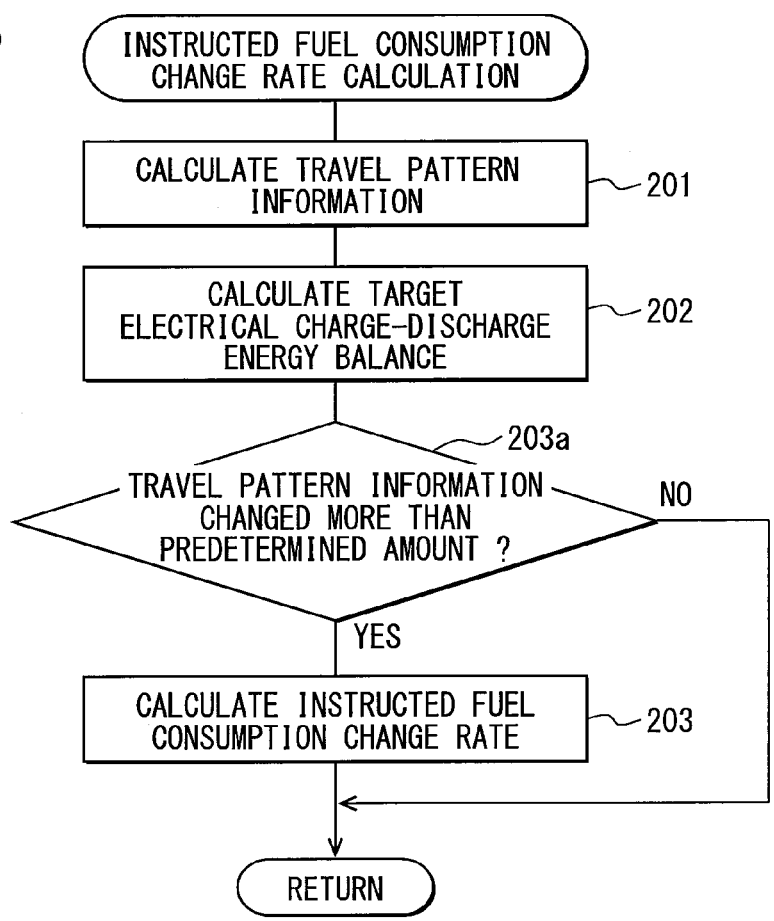
FIG. 8 is a flowchart of processes of the instructed fuel consumption change rate calculation routine in a second embodiment of the present disclosure.

The routine of FIG. 8 executed in the present embodiment has an addition of Step 203*a* that is inserted between Steps 202 and 203 of the routine of FIG. 7 described in the first embodiment. Other parts of the routine are the same as FIG. 7.

In the instructed fuel consumption change rate calculation routine of FIG. 8, after calculating the travel pattern information in Step 201, the routine proceeds to Step 202, and the target electrical charge-discharge energy balance is calculated. Then, the routine proceeds to Step 203*a*, and it is determined whether the travel pattern information has been changed more than a predetermined amount. In this case, for example, it is determined whether the present/current travel pattern information has been changed more than a predetermined amount in comparison to the previous travel pattern information. Alternatively, it may be determined whether the present/current travel pattern information has been changed more than a predetermined amount in comparison to an average value of the travel pattern information in a past preset period.

The present routine ends without updating the instructed fuel consumption change rate, when it is determined that the travel pattern information has not been changed more than a predetermined amount in Step 203*a*.

If, in the above-mentioned Step 203*a*, it is determined that the travel pattern information has been changed more than a predetermined amount, considering it necessary to update the instructed fuel consumption change rate, the routine proceeds to Step 203, and the instructed fuel consumption change rate is calculated and updated.

In the second embodiment described above, since the instructed fuel consumption change rate is updated when the travel pattern information has been changed more than a predetermined amount, the instructed fuel consumption change rate is updated at an appropriate timing according to the change of the travel pattern information.

Further, in the above-described first and second embodiments, a power transmission path from the engine 11 to the gearbox 13 does not have a clutch. However, a path between the engine 11 and the MG 12 may have a clutch, and/or a path between the MG 12 and the gearbox 13 may have a clutch. Further, the gearbox 13 may have a built-in clutch. Further, the gearbox 13 may be omitted from the configuration.

(Third Embodiment)

The third embodiment of the present disclosure is described with reference to FIG. 9. The description of the third embodiment is focused on a difference of the embodiment relative to the first embodiment, in which description of like parts in the first embodiment will not be repeated or is at least simplified for the brevity of the explanation.

Figure 9:
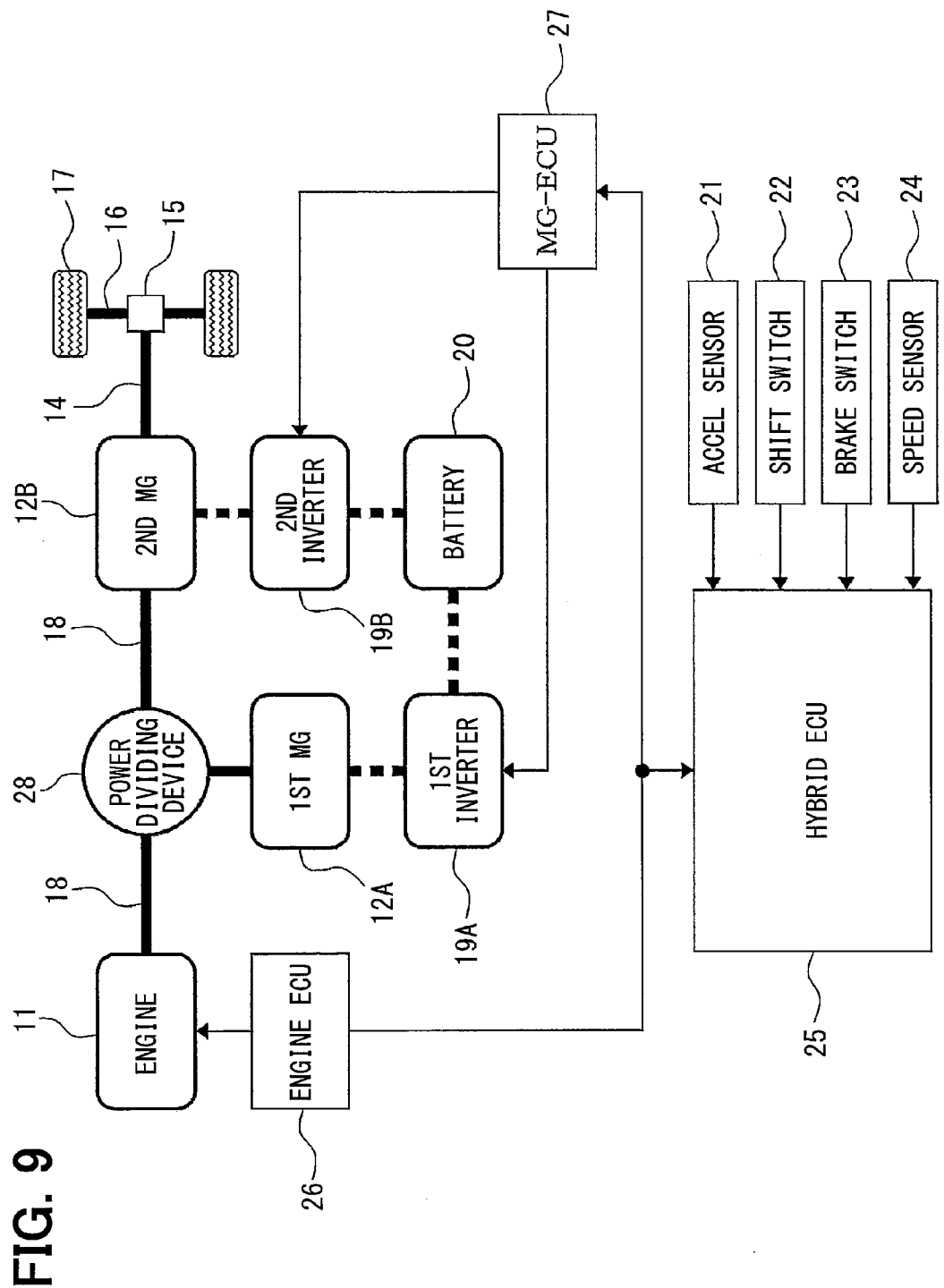
FIG. 9 is a block diagram of the drive system of the hybrid vehicle in a third embodiment of the present disclosure.

In the third embodiment, as shown in FIG. 9, the engine 11 and two MGs (i.e., a first MG 12A and a second MG 12B) are installed as a power source of the vehicle. The output shaft (i.e., crankshaft) of the engine 11, the rotation shaft of the first MG 12A, and the rotation shaft of the second MG 12B are connected via a planetary gear mechanism 28 which is a power dividing device, and the rotation shaft of the second MG 12B is connected to the drive shaft 14.

The first MG 12A and the second MG 12B respectively exchange the electric power with the battery 20 via inverters 19A and 19B. The MG ECU 27 controls the first the inverter 19A for controlling the first MG 12A, and controls the second the inverter 19B for controlling the second MG 12B.

In the third embodiment, the instructed fuel consumption change rate is also set up in a predetermined update cycle, and the engine output power increase/decrease amount is set up based on the instructed fuel consumption change rate and the target drive power. Under such a circumstance, the instructed fuel consumption change rate may be updated at every predetermined time, or may be updated when the travel pattern information has been changed more than a predetermined amount. In such manner, almost same effects as the embodiments 1 and 2 are achieved.

Although the present disclosure has been fully described in connection with preferred embodiment thereof with reference to the accompanying drawings, it is to be noted that various changes and modifications will become apparent to those skilled in the art.

For example, even though the engine output power increase/decrease amount is calculated in each of the above-mentioned first to third embodiments by using a map of the engine output power increase/decrease amount, the engine output power increase/decrease amount may also be calculated, for example, according to the instructed fuel consumption change rate and the target drive power by preparing/memorizing and using one or more equations (e.g., approximate equations) that specify the relationship between the instructed fuel consumption change rate, the target drive power, and the engine output power increase/decrease amount.

Further, even though the instructed fuel consumption change rate is calculated in each of the above-mentioned first to third embodiments by using the map of the instructed fuel consumption change rate, the engine output power increase/decrease amount may also be calculated, for example, according to the travel pattern information and the target electrical charge-discharge energy balance by preparing/memorizing and using one or more equations (e.g., approximate equations) that specify the relationship between the travel pattern information, the target electrical charge-discharge energy balance and the instructed fuel consumption change rate.

Further, even though the battery 20 is used as an electric power storage unit in each of the above-mentioned first to third embodiments, other parts such as a capacitor or the like may also be used as an electric power storage unit.

In addition, the present disclosure may be not only applicable to the hybrid vehicle having a configuration shown in FIG. 1 or 9, but may also be applicable to the hybrid vehicle in various configurations as long as it uses an (internal combustion) engine and an MG as a power source of the vehicle.

Such changes, modifications, and summarized schemes are to be understood as being within the scope of the present disclosure as defined by appended claims.

What is claimed is:

1. A control apparatus of a hybrid vehicle comprising:
an engine and a motor generator installed in the vehicle as a power source of the vehicle;
an electric power storage unit that exchanges an electric power with the motor generator;
a rate-of-change setting unit that sets, in a predetermined update cycle, a fuel consumption change rate representing a rate of change of a fuel consumption by the engine against a difference between an output power of the engine and a drive power of the vehicle; and
a power adjustment amount setting unit that sets, based on the fuel consumption change rate and a target drive power of the vehicle, an engine output power increase/decrease amount that minimizes the fuel consumption by the engine while controlling, for a preset period, an electrical charge-discharge energy balance of the electric power storage unit to have a predetermined value.

2. The control apparatus of a hybrid vehicle according to claim 1, wherein
the output power of the engine is a sum of the drive power, a loss of power consumed by other parts other than the engine, and an electrical charge-discharge power of the electric power storage unit.

3. The control apparatus of a hybrid vehicle according to claim 1, wherein
the rate-of-change setting unit sets the update cycle of the fuel consumption change rate to have a longer period than the update cycle of the target drive power.

4. The control apparatus of a hybrid vehicle according to claim 1, wherein
the rate-of-change setting unit fixes, at a constant value, the fuel consumption change rate between update timings of the fuel consumption change rate.

5. The control apparatus of a hybrid vehicle according to claim 1, wherein
the power adjustment amount setting unit pre-memorizes one of a map and an equation which specifies a relationship between the fuel consumption change rate, the target drive power, and the engine output power increase/decrease amount, and sets the engine output power increase/decrease amount by using one of the map and the equation.

6. The control apparatus of a hybrid vehicle according to claim 5, wherein
the power adjustment amount setting unit changes one of the map and the equation according to temperature information of at least one of the engine, the motor generator, or the electric power storage unit.

7. The control apparatus of a hybrid vehicle according to claim 5, wherein
one of the map and the equation is created in advance based on a loss characteristic of at least one of the engine, the motor generator, or the electric power storage unit.

8. The control apparatus of a hybrid vehicle according to claim 1, further comprising:
an information setting unit setting up travel pattern information of the vehicle; and
a balance setting unit setting up a target electrical charge-discharge energy balance of the electric power storage unit, wherein
the rate-of-change setting unit sets up the fuel consumption change rate based on the travel pattern information and the target electrical charge-discharge energy balance.

9. The control apparatus of a hybrid vehicle according to claim 8, wherein
the rate-of-change setting unit pre-memorizes one of a map and an equation which specifies a relationship between the travel pattern information, the target electrical charge-discharge energy balance, and the fuel consumption change rate, and sets up the fuel consumption change rate by using one of the map and the equation.

10. The control apparatus of a hybrid vehicle according to claim 8, wherein
the information setting unit sets up the travel pattern information to include one of a frequency or a percentage for each of plural drive power classes into which drive powers are classified.

11. The control apparatus of a hybrid vehicle according to claim 8, wherein
the information setting unit sets up the travel pattern information based on at least one of a past travel history or travel information from a navigation device.

12. The control apparatus of a hybrid vehicle according to claim 8, wherein
the balance setting unit sets, as the target electrical charge-discharge energy balance, a sum of (i) a discharged energy amount from the battery in an EV travel of the vehicle in which the vehicle travels only by the power from the motor generator (ii) a charged energy amount that is charged to the battery when the kinetic energy of the vehicle is used in a regeneration and is converted to the electrical energy by the motor generator, and (iii) a requested charge energy amount that is requested to be charged to the battery during a travel of the vehicle.

13. The control apparatus of a hybrid vehicle according to claim 8, wherein
the balance setting unit sets up the target electrical charge-discharge energy balance based on at least one of a past travel history or travel information from a navigation device.

14. The control apparatus of a hybrid vehicle according to claim 8, wherein
the rate-of-change setting unit updates the fuel consumption change rate (i) at a predetermined time interval or (ii) when the travel pattern information has been changed more than a predetermined amount.

15. An apparatus of a hybrid vehicle comprising:
an engine and a motor generator installed in the vehicle as a power source of the vehicle;
a battery configured to exchange an electric power with the motor generator;
an electronic control unit, comprising a computer processor, the electronic control unit being at least configured to perform:
a rate-of-change setting that sets, in a predetermined update cycle, a fuel consumption change rate representing a rate of change of a fuel consumption by the engine against a difference between an output power of the engine and a drive power of the vehicle; and
a power adjustment amount setting that sets, based on the fuel consumption change rate and a target drive power of the vehicle, an engine output power increase/decrease amount that minimizes the fuel consumption by the engine while controlling, for a preset period, an electrical charge-discharge energy balance of the battery to have a predetermined value.

16. The apparatus of a hybrid vehicle according to claim 15, wherein
the output power of the engine is a sum of the drive power, a loss of power consumed by other parts other than the engine, and an electrical charge-discharge power of the battery.

17. The apparatus of a hybrid vehicle according to claim 15, wherein
the rate-of-change setting sets the update cycle of the fuel consumption change rate to have a longer period than the update cycle of the target drive power.

18. The apparatus of a hybrid vehicle according to claim 15, wherein
the rate-of-change setting fixes, at a constant value, the fuel consumption change rate between update timings of the fuel consumption change rate.

19. The apparatus of a hybrid vehicle according to claim 15, wherein
the power adjustment amount setting includes pre-memorizing one of a map and an equation which specifies a relationship between the fuel consumption change rate, the target drive power, and the engine output power increase/decrease amount, and setting the engine output power increase/decrease amount by using one of the map and the equation.

20. The apparatus of a hybrid vehicle according to claim 15, wherein the electronic control unit is further configured to perform:
an information setting that sets up travel pattern information of the vehicle; and
a balance setting that sets up a target electrical charge-discharge energy balance of the battery, wherein
the rate-of-change setting includes setting up the fuel consumption change rate based on the travel pattern information and the target electrical charge-discharge energy balance.

* * * * *